United States Patent
Summerlin et al.

(10) Patent No.: US 9,576,014 B2
(45) Date of Patent: Feb. 21, 2017

(54) COMPUTER READABLE ELECTRONIC RECORDS AUTOMATED CLASSIFICATION SYSTEM

(71) Applicant: EMC Corporation, Hopkinton, MA (US)

(72) Inventors: Thomas A. Summerlin, Lutherville, MD (US); Timothy Shinkle, Alexandria, VA (US); Russell E. Stalters, Bethesda, MD (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/819,341

(22) Filed: Aug. 5, 2015

(65) Prior Publication Data

US 2015/0339338 A1 Nov. 26, 2015

Related U.S. Application Data (63) Continuation of application No. 14/173,186, filed on Feb. 5, 2014, now Pat. No. 9,129,003, which is a continuation of application No. 13/369,006, filed on Feb. 8, 2012, now Pat. No. 8,682,893, which is a continuation of application No. 12/315,610, filed on Dec. 4, 2008, now Pat. No. 8,135,710, which is a continuation of application No. 10/378,025, filed on Feb. 28, 2003, now Pat. No. 7,478,088, which is a (Continued)

(51) Int. Cl.
*G06F 17/30* (2006.01)
*G06F 17/27* (2006.01)

(52) U.S. Cl.
CPC ..... *G06F 17/30345* (2013.01); *G06F 17/2785* (2013.01); *G06F 17/30011* (2013.01); *G06F 17/30598* (2013.01); *G06F 17/30707* (2013.01); *G06F 17/30864* (2013.01); Y10S 707/99932 (2013.01); Y10S 707/99935 (2013.01); Y10S 707/99936 (2013.01); Y10S 707/99942 (2013.01); Y10S 707/99943 (2013.01); Y10S 707/99945 (2013.01)

(58) Field of Classification Search
CPC ............ G06F 17/2785; G06F 17/30707; G06F 17/30345; G06F 17/30864; Y10S 707/99943; Y10S 707/99932; Y10S 707/99936; Y10S 707/99945; Y10S 707/99942
USPC .................................. 707/723, 740
See application file for complete search history.

(56) References Cited

U.S. PATENT DOCUMENTS 4,719,571 A * 1/1988 Rissanen .............. G06K 9/6282
    707/803
4,817,036 A * 3/1989 Millett .............. G06F 17/30324
    707/769

(Continued)

*Primary Examiner* — Shahid Alam
(74) *Attorney, Agent, or Firm* — Van Pelt, Yi & James LLP (57) ABSTRACT

Classifying an electronic document in a computer-based system is disclosed. For each classification instance in a plurality of classification instances, a confidence data indicating a degree of confidence that the electronic document is associated with that classification instance is determined. A classification, based on a first classification instance in the plurality of classification instances, is assigned without human intervention to the electronic document if the confidence data associated with the first classification instance exceeds a first threshold.

7 Claims, 5 Drawing Sheets

Related U.S. Application Data continuation of application No. 09/592,778, filed on Jun. 13, 2000, now Pat. No. 6,553,365.

(56) References Cited

U.S. PATENT DOCUMENTS

| | | | | |
|---|---|---|---|---|
| 4,942,526 A * | 7/1990 | Okajima | ............... | G06F 17/277 704/10 |
| 5,251,131 A * | 10/1993 | Masand | ............. | G06F 17/2785 704/9 |
| 5,257,185 A * | 10/1993 | Farley | ..................... | G06N 5/02 707/769 |
| 5,325,445 A * | 6/1994 | Herbert | ................ | G06K 9/6282 382/225 |
| 5,418,946 A * | 5/1995 | Mori | ................. | G06F 17/30011 707/769 |
| 5,442,781 A * | 8/1995 | Yamagata | ........... | G06F 17/3064 707/779 |
| 5,463,773 A * | 10/1995 | Sakakibara | ......... | G06F 17/3069 707/705 |
| 5,588,149 A * | 12/1996 | Hirose | ............. | G06F 17/30265 707/723 |
| 5,696,964 A * | 12/1997 | Cox | ................. | G06F 17/30256 707/705 |
| 5,727,199 A * | 3/1998 | Chen | ................. | G06F 17/30539 707/728 |
| 5,822,741 A * | 10/1998 | Fischthal | ................ | G06K 9/62 705/31 |
| 5,956,727 A * | 9/1999 | Cheng | ............... | G06F 17/30566 707/769 |
| 6,026,399 A * | 2/2000 | Kohavi | ............. | G06F 17/30539 707/716 |
| 6,029,160 A * | 2/2000 | Cabrera | ........... | G06F 17/30067 707/705 |
| 6,029,164 A * | 2/2000 | Birrell | ............... | G06F 17/30722 707/705 |
| 6,038,561 A * | 3/2000 | Snyder | ............. | G06F 17/30011 707/716 |
| 6,044,375 A * | 3/2000 | Shmueli | ............. | G06F 17/3071 707/801 |
| 6,044,376 A * | 3/2000 | Kurtzman, II | .... | G06F 17/30867 707/705 |
| 6,112,181 A * | 8/2000 | Shear | ..................... | G06F 21/10 705/7.29 |
| 6,154,753 A * | 11/2000 | McFarland | ........... | G06Q 10/10 715/221 |
| 6,185,576 B1 * | 2/2001 | McIntosh | .......... | G06F 17/30011 707/999.2 |
| 6,442,555 B1 * | 8/2002 | Shmueli | ............. | G06F 17/3071 707/769 |
| 6,460,049 B1 * | 10/2002 | Becker | ................ | G06F 17/3071 707/778 |
| 7,039,602 B1 * | 5/2006 | Kapadia | ............... | G06Q 10/063 705/7.29 |

\* cited by examiner

| Classification | % |
|---|---|
| Contracts | 93 |
| Solicited | 35 |
| Unsolicited | 5 |

FIG. 3

| Case | Confidence Factor Range From: | To: | Action: |
|---|---|---|---|
| 1 | aa.a% | 100% | Assign to classification |
| 2 | bb.b% | aa.a-0.1% | Present pick list for user selection |
| 3 | cc.c% | bb.b-0.1% | Assign to predetermined review folder |
| 4 | 0% | cc.c-0.1% | Present user with Message: "This Document Does Not Meet the Criteria to become an Official Record." |

FIG. 4

| From | To | Action |
|---|---|---|
| 85.0 | 100 | File to enterprise date server with highest category returned |
|  |  | Present top 3-5 categories for user selection |
| 20.0 | 84.9 | File to review folder |
| 0 | 19.9 | Produce message that record not classifiable |

COMPUTER READABLE ELECTRONIC RECORDS AUTOMATED CLASSIFICATION SYSTEM

CROSS REFERENCE TO OTHER APPLICATIONS

This application is a continuation of co-pending U.S. patent application Ser. No. 14/173,186, entitled COMPUTER READABLE ELECTRONIC RECORDS AUTOMATED CLASSIFICATION SYSTEM filed Feb. 5, 2014, which is incorporated herein by reference for all purposes, which is a continuation of U.S. patent application Ser. No. 13/369,006, now U.S. Pat. No. 8,682,893, entitled COMPUTER READABLE ELECTRONIC RECORDS AUTOMATED CLASSIFICATION SYSTEM filed Feb. 8, 2012, which is incorporated herein by reference for all purposes, which is a continuation of U.S. patent application Ser. No. 12/315,610, now U.S. Pat. No. 8,135,710, entitled COMPUTER READABLE ELECTRONIC RECORDS AUTOMATED CLASSIFICATION SYSTEM filed Dec. 4, 2008, which is incorporated herein by reference for all purposes, which is a continuation of U.S. patent application Ser. No. 10/378,025, now U.S. Pat. No. 7,478,088, entitled COMPUTER READABLE ELECTRONIC RECORDS AUTOMATED CLASSIFICATION SYSTEM filed Feb. 28, 2003, which is incorporated herein by reference for all purposes, which is a continuation of U.S. patent application Ser. No. 09/592,778, now U.S. Pat. No. 6,553,365, entitled COMPUTER READABLE ELECTRONIC RECORDS AUTOMATED CLASSIFICATION SYSTEM filed Jun. 13, 2000, which is incorporated herein by reference for all purposes.

FILED OF THE INVENTION

The present invention relates to data processing and in particular to the science of electronic records management and file management including the process of automatically capturing and classifying a record within a records file plan as evidence of the conduct of business processes.

BACKGROUND OF THE INVENTION

To file or transform an electronic document properly into an official record has traditionally required an end user to decide that the document should become an official record. Following that decision, the user must then associate or file the official record in a particular records subject category within a records file plan or organization. This association is based on the meaning and understanding of the document content, relative to the meaning and understanding of the particular records subject category to which the document should be associated once it has been declared an official record. This association is significantly distinguishable enough from other potential records subject categories in the file plan to provide the user with only one choice.

Increasingly, documentation and written communications forming official corporate records and working documents originate in or are reduced to electronic form. For example, businesses that receive and exchange inquiries and conduct business by telephone and mail now, with increasing frequency, receive and exchange electronic communications and conduct business in the electronic forum including electronic mail or the capture of existing paper records into electronic form through imaging. Typically, these electronic communications, or captured documents, are organized into document and database filing systems for subsequent document or record retrieval to permit review and reproduction of the document when required at some later point in the future.

These computer readable forms of documents are stored in document collections on computer systems for easy access by the users of the computer system on which the document collections are stored. Such document collections, which are managed as official records, are unique in that they combine the official record electronic document with some very specific key data elements that adequately describe the record. The specific key data elements that describe an official record can be termed metadata and, typically, the metadata is stored in one or more databases. With each official record, there is an associated records subject category to specify the formal business rules relating to how the record should be maintained. Computer systems that provide access to such record collections include computer network based systems that permit authorized users to access the records collection and database over the enterprise or corporate network are typically termed records management systems. Where the records collection is available over an enterprise or corporate network, authorized users frequently also have the ability to obtain access to the records collection and database from a remote location. Remote location access is effected by establishing communications between the user desiring access to the data and the computer system which makes the stored records collection or database data available.

It is inherent in enterprise records systems, whether electronic or paper based, that a particular document may become lost or unavailable within the organization or corporate entity due to reorganizations and the ongoing reassignment of functions and responsibilities within the organization or corporation. Consequently, the need to reorganize document collections to reflect new organizational structures and functions and to ensure that documents can be made available for future retrieval has resulted in increasing reliance on automated systems which can adapt to the volume of documents or records maintained by an organization. One approach is to formulate a file plan as part of an electronic record keeping system or ERS. In ERS systems, a file plan specifies the framework for maintaining the organizational documents and electronic records and determines how long the records are maintained.

Under a file plan, organizational documents and document collections in the ERS are assigned attributes to meet organizational and legal requirements. For example, one of the attributes is a retention time specifying how long particular types of records are to be maintained. In a file plan, documents are frequently classified according to the functional unit of the organizational structure to which they relate. For example, human resources related records include such documents as those that provide employee and job applicant information. Unsolicited rsums, job performance evaluations and the like are the types of documents that will be maintained by a human resources department. Similarly, documents, which relate to the design and production of services or goods offered by the organization, are kept by the appropriate organizational unit responsible for the specific functions of the operational unit of the organization.

Even with an ERS file plan, there is risk that important documents will be lost for reasons other than the disappearance of the document itself A document may become misplaced in the enterprise filing system or miss-classified. Such miss-classified documents present a liability to an organization because the appropriate records management rules to meet organizational and legal requirements will not be accurately applied to the documents. Also, with increasing frequency, important documents originate in a wider variety of different forms beyond traditional sources within an enterprise. For example, paper based mail systems, facsimile correspondence, electronic mail and electronic data exchange all can form sources of important corporate or enterprise records. Naturally, the selection or mix of record sources will vary with each different organizational unit within the enterprise. Consequently, electronic forms of documents or records occur with increasing frequency within an enterprise organization. This trend, coupled with increasing diversity in the sources of records and changing systems and departmental requirements, makes maintaining a file plan or a current and reliable classification system for electronic records keeping systems increasingly vital.

In the past, automated document classification systems have been proposed but which do not provide a boundary between what can be classified reliably by a machine and what required human intervention and review. For example U.S. Pat. No. 5,463,773 to Sakakibara et al provides a document classifying system that is based on a recursive keyword selection algorithm that is used to build a document classification tree. The system of Sakakibara builds a classification tree which may or may not relate to the functional organizational units of an enterprise which has established systems and pre-existing classification categories for existing documents into which like documents created in the future are to be classified or filed. Automated classification tree structure creation and maintenance is not beneficial to an enterprise, which seeks to classify large volumes of documents, such as received e-mail, into existing enterprise classifications for record handling and storage.

Other prior art document classification systems and methods include those described in U.S. Pat. No. 5,727,199 to Chen and U.S. Pat. No. 5,251,131 to Masand, which develops a set of document classification rules based on a training set. In Masand, probability weighting is used to classify natural language. In U.S. Pat. No. 6,026,399, Kohavi teaches the production of a numeric discrimination or purity factor to discriminate between relevant and non-relevant records. In U.S. Pat. No. 6,044,375 to Shmueli, a neural network is used to extract metadata from computer readable documents.

SUMMARY OF THE INVENTION

It is an object of the present invention to provide for the automatic classification or categorization of computer readable electronic records or forms of documents. Consequently, the inventive system eliminates the need for the end user to identify data as a record and to associate the record accurately to a particular record subject category. The inventive system does this through the use of software defining a boundary between automated classification or association and when such classification or association requires the intelligence of human understanding of the meaning or context of the candidate electronic record. Preferably the process to implement the automated classification or association of a record to a particular record subject category within a file plan can itself exhibit features of the intelligence of human understanding of the meaning or context of the candidate electronic record.

The classification or record subject category assigned to a record is taken from a pre-defined or pre-existing classification assignment. The inventive system assigns a particular instance of a pre-existing classification or category to a record presented to the system for classification. In one embodiment of the invention, the computer readable records or documents to be classified are text based. The records presented to the system to be classified include text (TXT), format records or records in hypertext mark-up language (HTML) format. Other computer readable text based document formats can be used.

The inventive system operates in two basic modes, training mode and classification mode. The first mode is referred to as the training mode and entails processing a pre-defined classification list and a training set of several, at least three or five and preferably twenty to twenty-five or more, documents for each instance or entry in a classification list. The training mode processing involves a classifier or classification agent that processes the records already stored or organized within the classification list and training set to establish an association or correlation between the content of the training documents with each pre-specified associated classification. Once the training mode processing is complete, the second mode of operation is available. The second mode is termed the automatic classification mode. In the automatic classification mode, further documents are provided to the classification agent for classification. For each document presented after training, the classification agent will produce or output a corresponding classification instance or group of classification instances and a confidence factor for each instance. In the classification mode, the processing of a document will result in the classification agent producing a classification instance, or several classification instances, each with an associated confidence factor. In the preferred embodiment, the confidence factor ranges between 0 and 100% and represents the level of confidence that the category agent has found exact match (in the case of 100%) or closely matches (in the case of a value less that 100%) to a predefined category.

The classification instance and confidence factor output of the classification agent for the document to be classified is provided to the decision control table and compared with an action to be taken for the given confidence factor within the decision control table. The confidence factor decision control table has a plurality of actions or cases for classification of the document. The action or case to be taken in relation to the document to be classified will commence based on the classification instance and confidence factor returned by the classification agent. The action or processing of the document is controlled or decided by user provided settings contained in the confidence factor table based on the classification instance and confidence factor returned by the classification agent. The action or processing of the document includes either further processing by computer or requesting input from an operator or user of the system to classify the document. The confidence factor output from the classification agent is compared to a user configurable list of ranges provided in the confidence factor decision control table. The processing options or actions to be selected or taken in respect of the document processed are selected or determined by the entries in the confidence factor decision control table. Preferably, the ranges specified in the confidence factor decision control table are discrete contiguous segments. That is, the ranges are non-overlapping and without gaps.

The invention also provides a mode of operation to retrain the classification agent by using the classification agent to process a "retraining set" of records in conjunction with a classification group containing all instances of all possible classifications. The retraining set preferably provides more document instances per classification instance than the minimal document instance of count of three to five documents per classification instance required for initial classification agent training and can include the entire document collection and associated classifications. Retraining mode is beneficial for adapting the classification agent to current document collections periodically to improve classification agent performance provide a basis for the user to set confidence factor table ranges.

In one of its aspects, the invention provides a computer based system for automated classification of electronic document records comprising a source of electronic records and an electronic document server operably connected to at least one electronic document database and including means to communicate an electronic document and means to receive user control input. The system further includes a classification agent in communication with the electronic document server, and the classification agent is operable in a training mode and a classification mode and includes: means to receive an electronic document; means to receive a classification instance; and output means to provide a result. The system has decision control means accommodating at least two processing actions each processing action having a user configurable activation criteria responsive to said classification agent result.

In another of its aspects, the invention provides a computer based system for automated classification of electronic document records comprising an electronic document server operably connected to at least one electronic document database and including means to store an electronic document and means to receive user control input and a source of electronic records operably connected to the electronic document server. The system further includes a classification agent in communication with said electronic document server, the classification agent is operable in a training mode and a classification mode and includes: means to receive an electronic document; means to receive a classification instance; and output means to provide a result. A decision control means is included to accommodate at least two processing handlers selected from the group comprising: means to assign a classification instance to an electronic document; means to produce a list of at least two classification instances for an electronic document; means to assign a review classification instance to an electronic document; and means to assign a null classification instance to an electronic document.

The invention will now be described with reference to the drawings in which like referenced numerals have been used to depict like features of the invention throughout.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
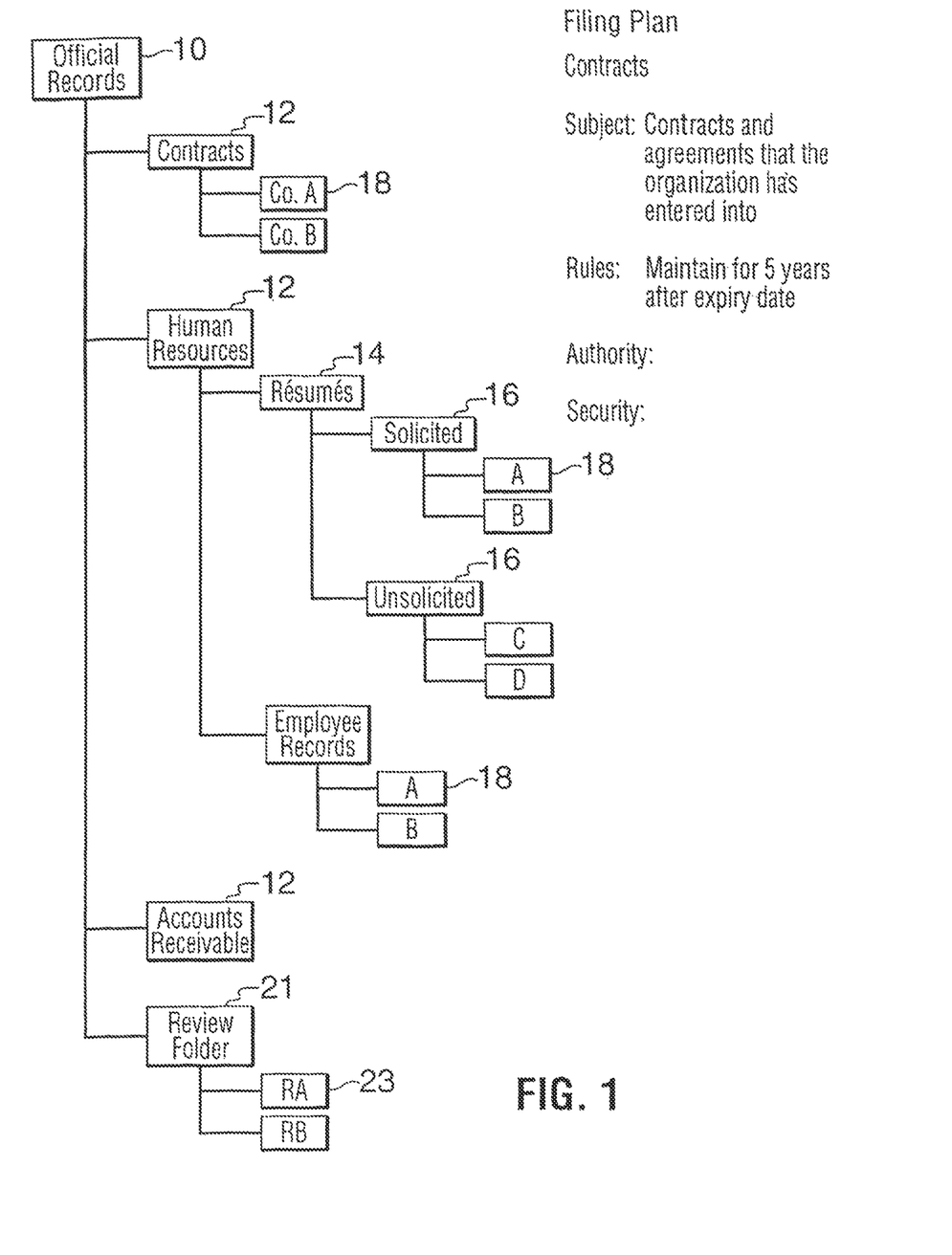
FIG. 1 is a functional block diagram of a tree structure depicting a records classification structure including excerpts from an official filing plan for an organization.

FIG. 1 shows a functional block diagram of a tree structure depicting a records subject classification structure for an organization. The classification structure preferably includes an official file plan. The filing plan forms part of a document classification structure or list. The classification structure provides specific instances of records classifications into which particular documents are classified and into which future documents should be classified The filing plan tree structure includes a root node 10 labelled "Official Records." Root node 10 connects to a plurality of classification folders 12. Each classification folder 12 defines document groups or organizational groups, which contain official records of the organization. The classification folders 12 can point to records 18 or to other classification folders, or sub-classification folders, such as the rsums classification folder 14 of the human resources classification folder 12.

Classification sub-folders, such as rsums classification folder 14, can in turn point to other classification sub-folders 16 or records 18. For example, rsums classification folder 14 points to classification sub-folders 16. Classification sub-folders 16, contains two classification folders, one to contain solicited rsums and the other classification folder to contain unsolicited rsums. In the classification tree structure, each classification folder may contain other classification folders or records. The records or documents within a classification folder are collected within or under the classification folder as the records relate to the folder contents. The objective of the classification folder contents, that is to define the retention rules, security and access limitations and like attributes, and definitions of the documents to be placed into a classification folder, are defined by the file management rules of the organisation.

For example, contracts classification folder 12 contains records 18 corresponding to agreements and contracts that the organization has entered into. The documents contained within the contracts classification folder can be in any suitable computer readable representation of the document such as a text file or even an image file that has an associated text file, for example an optical character recognition (OCR) text file produced from the image contained in the image file. Preferably, the documents maintained within a classification folder are subject to file management rules for the classification folder. The file management rules are specified in the file plan that includes the classification folder. Commonly, the file management rules provide for document retention periods. In the example of FIG. 1, the retention period for contract documents is set to maintain those documents for a period of five years after the contract or agreement expiry period. File management rules of a file plan also generally include other items such as an authority designation to delineate the person or organizational unit responsible for the documents filed within the classification, what constitutes a document that is to be included in the classification, who has the authority to add, change or remove the documents in the classification and other parameters relating to documents kept within the classification. The file plan file management rules generally provide security rules that designate who have the right to access the document. The classification folders also may conveniently include text description to define the subject contents of the documents maintained within the classification folder. For example, the contract subject is exemplified as "contracts and agreements, which the organization has entered into".

Shown in FIG. 1 is a Review Classification folder 21, the function of which will become apparent in the description of the invention; In accordance with the invention, a candidate document is processed by a classification agent and, in certain circumstances which are configured by the user, the candidate document presented to the classification agent will be automatically placed into the Review Classification folder 21. Documents in the Review Classification folder 21 are available for subsequent inspection and review by a designated user. In FIG. 1, the available documents to be reviewed 23 are graphically depicted the box symbols labelled as RA and RB.

Figure 2:
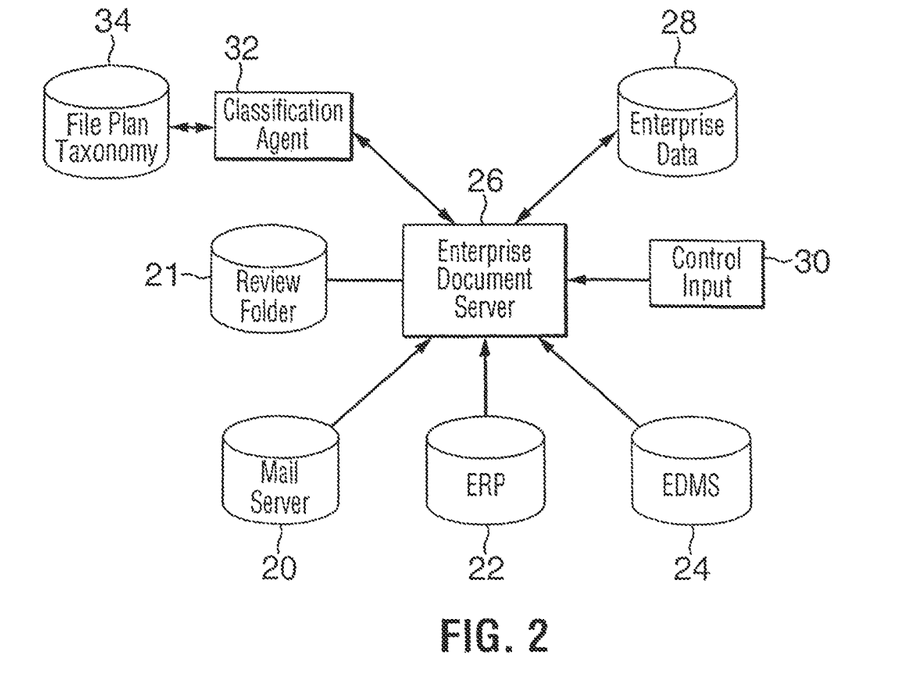
FIG. 2 shows a representative symbol diagram of enterprise records management, file management, and database systems incorporating features of the invention.

FIG. 2 shows a representative symbol diagram of enterprise records management, file management, and database systems incorporating features of the invention. The enterprise systems for providing sources of and electronic data repositories for electronic records that an enterprise may have available to it are numerous. For example, one source of electronic records includes e-mail that is accessed by users connected to, or in communication with, a mail server 20. Other electronic records data repositories include various enterprise resource planning systems (ERP) database systems such as a SAP database 22 maintained using the proprietary systems of SAP AG of Germany, for example. Other systems for providing storage of and access to data records of an enterprise are shown representatively by the generic reference to an electronic data management system or EDMS 24.

In the preferred embodiment, an enterprise document server 26 accesses the data contained in these electronic document repositories. The enterprise document server 26 controls the appearance of the electronic document data in an enterprise records database 28. The appearance of a record in the enterprise document server 26 can be accomplished by copying the document from one of the source repositories 20, 22 or 24 into the enterprise records database 28. When a copy of the source document is taken, the source document in repository 20, 22 or 24 can remain, or the source document can be deleted from the source repository 20, 22 or 24 with the only copy remaining in the enterprise records database 28. Alternately, a pointer reference record can be inserted into the enterprise records database 28 that points or refers to the source document in its native repository 20, 22 or 24. When a pointer reference record is inserted into the enterprise document database 28, the enterprise document server 26 will use the pointer reference record on subsequent access requests for that document to obtain the document from the source repository 20, 22 or 24 as located by the pointer reference record. It will be understood by those skilled in the art that the presence of an electronic document in the enterprise records database will enable an ERS file plan to be implemented by applying the file plan to the enterprise records database 28 for automated management by the enterprise document server 26.

The processing performed by enterprise document server 26 is directed by using various forms of user input, depicted in the figure as control input 30 and which will be described in more detail subsequently. Enterprise document server 26 controls electronic document process flow to classification agent 32 and the process flow is based on user control input 30. When the classification agent, 32 is invoked by the enterprise document server 26, the text of a document is provided to classification agent 32. Classification agent 32 operates in two basic modes, namely, learning mode and evaluation or classification mode. When classification agent 32 is provide with the text of a document, which is passed to it by the enterprise document server 26, the classification agent will be instructed to process the document text in either the learning mode or the evaluation mode. Classification agent 32 will be instructed to process the contents of the electronic document in the manner directed by the enterprise document server 26.

User Control

FIG. 2 shows user control input 30 as a separate control input to enterprise document server 26 independent of the various repositories 20, 22, 24 and 28, where an electronic document is stored. However, it will be understood by those skilled in the art that control input 30 can originate from user interaction or user initiated processes when operating any one of these repositories 20, 22, 24 and 28. Using a distributed processing environment, such as the Component Object Model (COM) paradigm available from Microsoft Corporation, and the Object Linking and Embedding (OLE) functionality and facilities of the Microsoft Windows™ operating system, an application programming interface (API) for the enterprise document server 26 can enable user control input 30 to be provided to the enterprise document server 26 from numerous other client applications. For example, the user interface to mail system or server 20 can be adapted to include facilities for generating control input to enterprise document server 26 by a user operating the email system when reviewing email documents.

Training Mode

The classification agent 32 is operable in two modes, one of which is a training mode or a learning mode. In the training mode, the text contents of a document are passed to the classification agent 32 together with a pre-assigned classification instance, which corresponds to or has been associated with the document. One way to effect training of the classification agent is to traverse a classification structure, for example the tree structure depicted in FIG. 1 and provide the classification agent 32 with each document together with the classification instance from which the document was retrieved. For classification agent training, a suitable classification structure selected to train the classification agent has several documents populating each node or folder of the classification structure. There must be at least 3 or 5 documents per classification instance and preferably numerous documents, such as at least 20 or more, depending on the algorithm employed by the classification agent.

There are several computer based algorithms that are suitable to perform the function of the classification agent, including: neural networks, document key word indexing algorithms providing word tuples or statistical analysis of document key words and word tuples. For each training document, the classification agent algorithm processes the text contents of the training document along with being provided with the classification instance assigned to the document. Using these inputs, the classification agent builds an association or preference between the document contents and the pre-assigned classification which is stored in a file plan taxonomy database 34. Preferably, the classification agent will also build a disassociation, or preference to exclude, the other classification instances to which the training document does not belong. Thus, in training mode, the classification agent training will develop state information establishing a probabilistic association or linkages between classification instances and document contents the result of which is kept in a data file which is referred to as the file plan taxonomy database 34. This stored probabilistic association will form the basis for assigning a classification instance and a confidence factor to subsequently presented documents that do not have assigned classifications. This subsequent candidate document classification instance assignment is the other mode of operation of the classification agent, and is called the evaluation or classification mode.

Evaluation Mode

In the other mode of operation, the evaluation mode or classification mode, classification agent 32 is provided with the text contents of a candidate document or record. When classification agent 32 is in the evaluation mode, the classification agent will evaluate the text contents of the candidate document or record with reference to past training data contained in the file plan taxonomy database 34 to produce a result list of classification instances for the candidate document. For each classification instance in the result list, the classification agent provides a numeric result establishing a probability, or confidence level, to associate the text content of the document with the classification instance.

Figure 3:
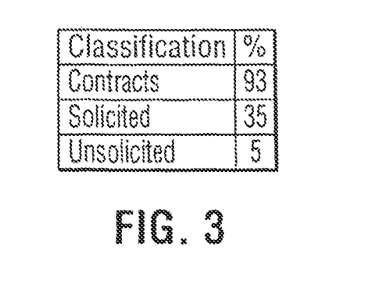
FIG. 3 is a table providing an example of the classification agent evaluation mode output result list.

FIG. 3 shows a table providing an example of the classification agent evaluation mode output result list. In this example, the classification agent has processed a candidate document and produced a result list containing three classification instances for the document, namely the "contracts", "solicited" and "unsolicited" classification instances or folders. This result list is shown in the three rows of the table of FIG. 3. For each row of the classification agent return result list, there is also provided a confidence level that has been produced by the classification agent. The confidence level is a numeric representation falling within a predetermined range. In the preferred embodiment, the larger the number in the numeric representation the better the association or confidence level the classification agent places in the association between the content of the candidate document and the indicated classification instance or folder name. For example, the classification agent has provided a confidence level of 93% for the "contracts" classification instance and a confidence level of 35% for the "solicited" classification instance and 5% for the "unsolicited" classification instance. Thus, in the evaluation mode, the operation of the classification agent is to produce a list of classification instances together with a confidence level for each classification instance based on the contents of a candidate document. For a given candidate document, the output of the classification agent can include a null list or a table that has no row entries. In such a return, the classification agent has no classification, which it associates with the text contents of the candidate document. A functional equivalent to a null table result would be a return table that contains one row, which assigns a confidence level of zero to the classification instance of the row.

Figure 4:
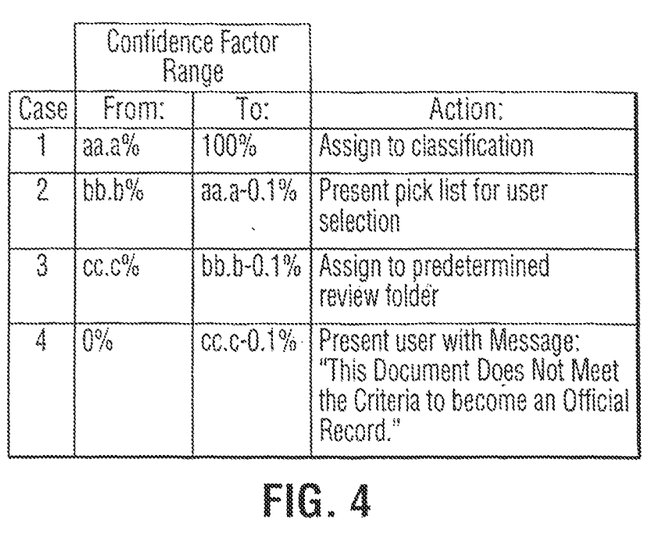
FIG. 4 is a decision control table, which is user configurable, to control automated electronic document classification and processing.

FIG. 4 depicts a decision control table, which provides the user with the ability to configure automated electronic document classification and processing based on the confidence factor output from the classification agent. The table provides for up to 4 actions or cases that can be made in response to the confidence factor produced for a candidate document by the classification agent. Row 1, indicated by the entry "1" in the "Case" column, provides a user configurable lower limit aa.a % in the "From:" column which defines the lowest value of a confidence factor produced by the classification agent that will result in the action specified in the "Action" column being taken. In the preferred embodiment, a confidence factor of 100% is the largest value of a confidence factor, which can be produced, and 0% is the smallest value. Of course, other ranges can be used, which can be numeric or even alphabetic symbols or other forms to express a range of values. The highest value of a confidence factor that can be produced by the classification agent is 100% which is the highest value of a confidence factor that is specified in the "To" column for case 1. Therefore, when the classification agent returns a value within the range specified for case one, namely aa.a % to 100%, then the action specified in the "Action" column will be taken for the document. The case 1 action is the automatic classification option. Therefore, candidate documents which meet the user configurable confidence factor range specified for case 1 will be automatically placed into the enterprise records database 28 by the enterprise data server 26.

For case 2, the confidence factor returned by the classification agent falls within the range specified as bb.b % to aa.a-0.1%. The upper bound of the case 2 range is less than the lower bound of case 1. There is no overlap or gap between the upper bound of the range of case 2 and the lower bound of the range of case 1. These two ranges, and all of the ranges, are contiguous. In the preferred embodiment, the confidence factor for each classification produced by the classification agent is selected from a universe of the 1,001 values represented by a single decimal point number having a value between 0.0 and 100.0 inclusive. Other confidence factor value universes could be provided with suitable changes to the case selection confidence factor ranges. In the preferred embodiment, case 2 actions are optional. That is, the user can configure the confidence factor range associated with this case to prevent this case action from being taken.

For case 3, the confidence factor returned by the classification agent falls within the range specified as cc.c % to bb.b-0.1%. The upper bound of the case 3 range is less than the lower bound of case 2. There is no overlap or gap between the upper bound of the range of case 3 and the lower bound of the range of case 2. As previously stated, these two ranges, and all of the ranges, are contiguous. For case 3, the action taken in relation to the document presented is to place the document in the Review Classification folder 21. Documents in the Review Classification folder 21 are documents which may be records that should be placed into the enterprise records database 28 but which require review by a user to determine whether the document is such a record, and, if so, what classification the document should be assigned to. In the preferred embodiment, case 3 actions are optional. That is the user can configure the confidence factor range associated with this case to prevent this case action from being taken.

For case 4, no action will be taken for the document in relation to the enterprise document database 28. If no action is selected then the inventive system preferably produces a message to confirm that the document has been reviewed by the system and the system review result is that the document does not require placement into the enterprise records database 28. No action may be confirmed, for example, by producing a confirmatory message such as: "This Document Does Not Meet the Criteria to become an Official Record". A no action confirmatory message is preferable to confirm that the system received and processed the candidate electronic document. The no action confirmatory message provides an indication that the processing result for the candidate document is a confidence factor of zero percent or a confidence factor that is within the zero to cc.c-0.1% range of case 4. Additionally, the user can manually assign the document to a records subject category or select the Review Classification folder 21 and have the document filed as a record into either of these choices. This option is made available to process documents, which may be non-textual in content but nevertheless should become an official record or for documents that may be of a new currently untrained category that was recently added to the records file plan.

Figure 5:
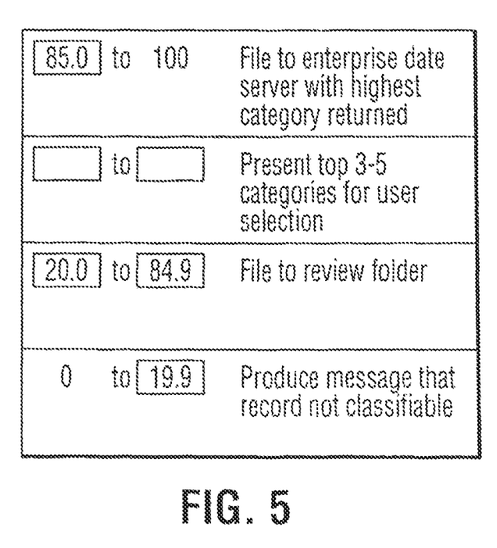
FIG. 5 shows the decision control table of FIG. 4 provided with example confidence factor ranges and illustrating a user configuration where an optional user selected document action is disabled.

FIG. 5 shows the decision control table of FIG. 4 provided with example confidence factor ranges and illustrating a user configuration where optional case 3 action is disabled. The user has configured the decision control table action cases by providing numeric ranges that specify the confidence factor results produced by classification agent 32 which will result in the specified actions being taken for candidate documents presented to the classification agent operating in classification or evaluation mode. For confidence factor return results in the range 85.0 to 100, the system will process the candidate document to file the document to the enterprise records database server under the classification instance that resulted in the confidence factor within the range specified. This classification instance would be the row 1 entry in the classification agent return result list exemplified in the table of FIG. 3. The case 2 optional action, which in this figure is described as "Present top 3-5 Categories for user selection" has been disabled as indicated by the blank entries for the confidence factor range limits. The case 3 optional action is enabled and active for classification agent return result confidence factors falling in the 20.0 to 84.9 range. The case 4 candidate document action is selected when the candidate document returns a classification agent return result confidence factor, which is in the range 0 to 19.9.

Figure 6:
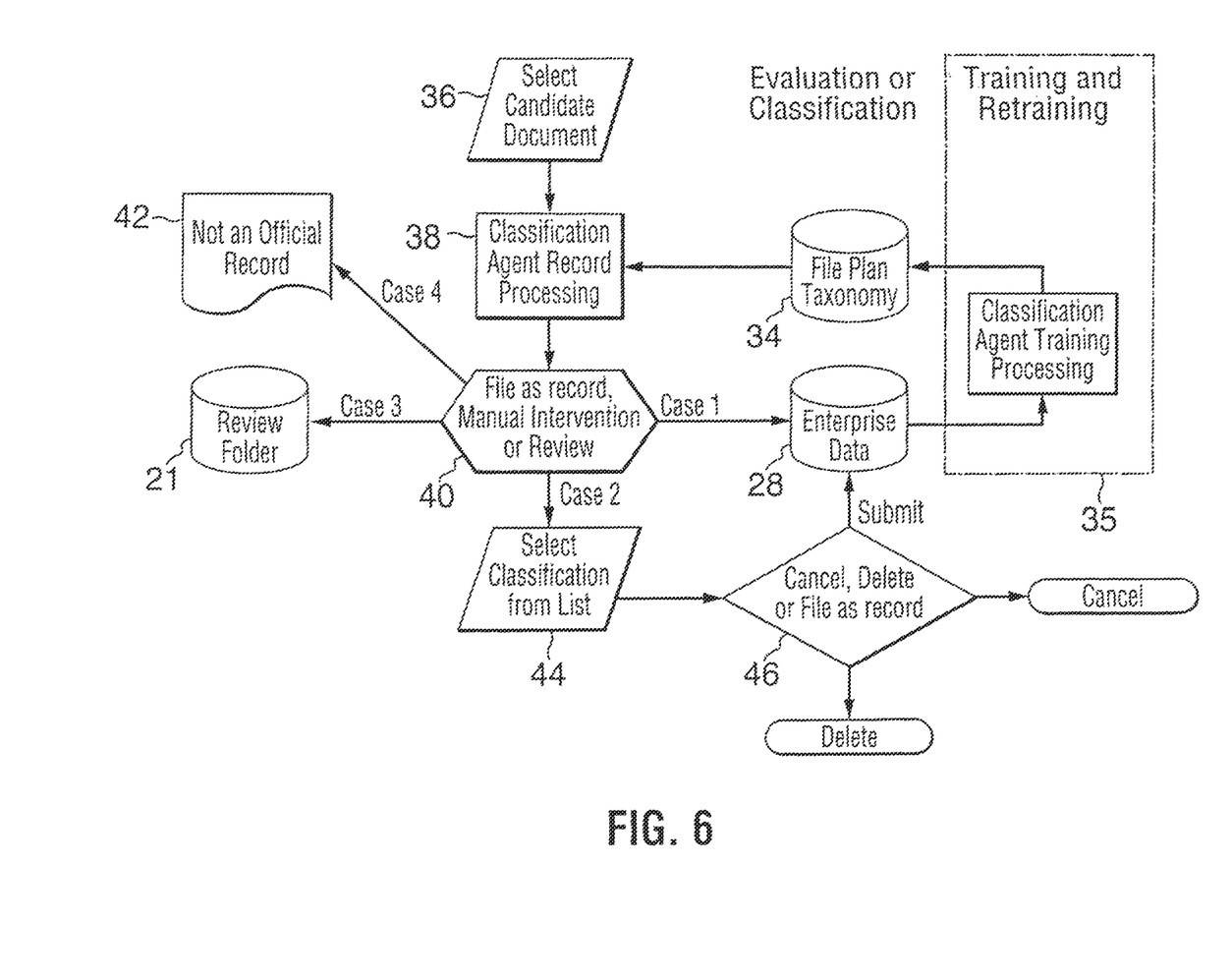
FIG. 6 is a decision flow diagram depicting the process of categorizing a document and performing the actions or operations to the document based on the configuration shown in FIG. 4.

FIG. 6 shows a decision flow diagram depicting document process flows and database interactions in relation to the classification agent when operating in the training or retraining mode as shown in the portion of the diagram within the dotted line box 35 and in the evaluation or classification mode in the balance of the diagram. With reference to the user control input 30 depicted in FIG. 2, a user selects a candidate document to be processed at step 36. The submission of candidate documents, or selection of candidate documents as depicted by step 36 of FIG. 6 can be accomplished using several different options known to those skilled in the art. For example, the application can be provided with a file-open dialogue box, such as that shown in FIG. 7, to prompt the user for input to select a file. Another way to select a file for submission is to supply the file name as a command-line parameter when the classification agent evaluation or classification process task of FIG. 6 is initiated. This method of submission allows advance users to incorporate elaborate techniques for document submission such as using batch files. Another method of submission is to provide the classification agent evaluation or classification process task of FIG. 6 as a COM object which can be activated when the user is working with another application. For example by incorporating the Microsoft Corporation Explorer Shell Extension Interface in the COM object implementation of the classification agent evaluation or classification process task to enable the user to initiate the classification agent evaluation or classification process when operating the Explorer feature of Microsoft Windows™.

The selected candidate document is presented to the classification agent (32 of FIG. 2) for classification processing as depicted in process box 38. The classification agent examines the content of the document with reference to historical data maintained in the file plan taxonomy database 34 to produce a result list which forms the basis on which the decisions depicted in decision box 40 are taken. The decision box 40 depicts the document processing actions one of which is selected based on the result returned by the classification agent the user configuration of the decision control table shown in FIG. 4. If the return result of the classification agent is within the Case 1 range, then the Case 1 exit path is taken and the document is inserted in the Enterprise database 28. If the classification agent result compared to the decision table parameter configuration is within a range to select the Case 2 outcome, then a list of classification instances will be presented to the user to select from as depicted in the process box 42 of the Case 2 outcome path from decision box 42. With a Case 2 outcome, the user can provide an input to indicate what disposition is to be made of the document when the user input is evaluated at decision box 46. As indicated by the outcome paths of decision box 46, the user input can choose to Cancel further processing of the document which will have the effect of leaving the candidate document selected at box 36 unchanged but will not place a copy of that document into the enterprise database 28. Alternately, the user input can choose to Delete the document which will have the effect of deleting the candidate document selected at box 36 and, naturally, will not place a copy of the deleted candidate document into the enterprise database 28. As well the user input can choose to Submit the candidate document selected at 36 to the enterprise database 28.

If the classification agent result falls within the configured decision table range to route the candidate document selected at 36 to the classification review folder 21, then the Case 3 exit will be taken from decision box 40 and a copy of the candidate document will be placed into the classification review folder 21.

If the classification agent result falls within the configured decision table range to reject the document, then the Case 4 exit will be taken from decision box 40 and a message will be produced confirming that the document has been reviewed but will not be processed as shown by the report box 42 inscribed with "Not an Official Record".

FIG. 6 also depicts the relationship between the enterprise records database 28 in FIG. 2, the file plan taxonomy engine and the classification agent 32 during the training mode of operation as shown in the diagram area surrounded by dotted box 35.

Figure 7:
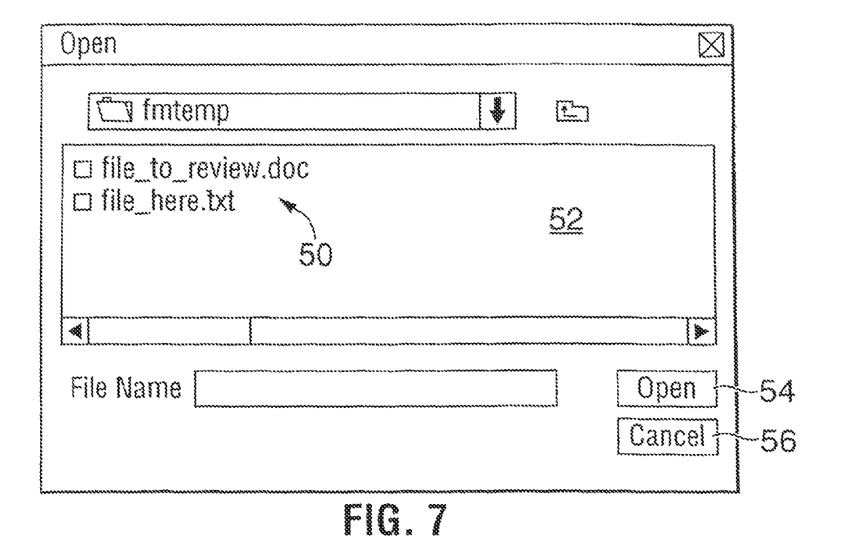
FIG. 7 is open dialog box representing a user input interface to obtain user input to select a candidate document to be processed by the classification process of FIG. 6.

FIG. 7 is open dialog box representing a user input interface to obtain user input to select a candidate document to be processed by the classification process of FIG. 6. A file list 50 is presented in a list box area 52. The user can select a particular file from file list 50 using a computer mouse or keyboard. Once the desired file has been selected by the user, the Open control button 54 is activated causing the selected file to be processed. The file selection process can be cancelled, if desired, by selecting the Cancel control button 56.

Figure 8:
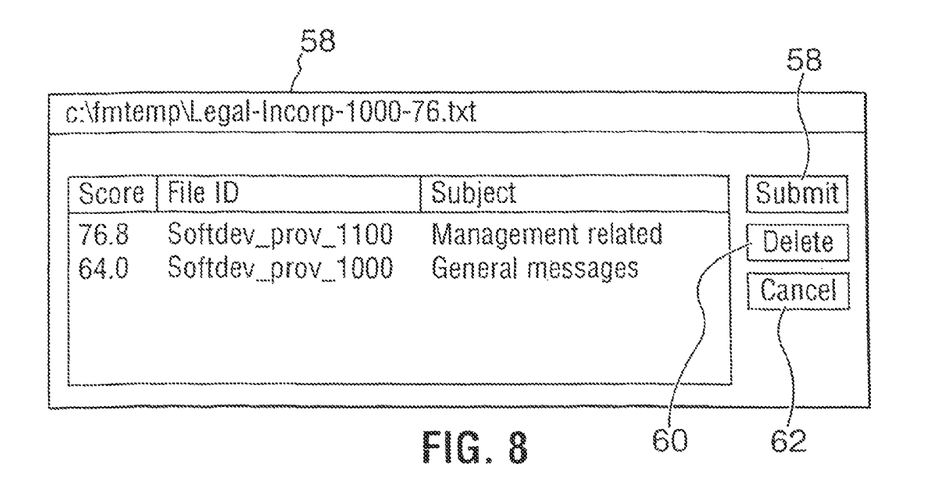
FIG. 8 is dialog box representing a user input interface to obtain user input to select the document processing options of decision box 46 of FIG. 6.

FIG. 8 is dialog box representing a user input interface to obtain user input to select the document processing options of decision box 46 of FIG. 6. In this dialog box, the path name of the candidate document or file being processed is identified in the banner area 58 of the dialog box, namely: c:.backslash.fmtemp.backslash.legal-Incorp-1000-76.txt.

The processing of the file by the classification agent 38 has resulted in two classifications being proffered for the candidate document, the higher confidence level of "76.8" being assigned to the FileID or classification instance of "Softdev-prov-1100" and the next higher confidence level of "64.0" being assigned to the classification instance of "Softdev-prov-1000". For further guidance of the user that is to select the proper classification from the proffered list, each classification instance includes an associated "Subject" which is a text describing the contents of the particular classification instance. The user can select the appropriate classification instance from the list using the mouse or keyboard and initiate further processing of the candidate document by selecting a disposition button. For example, once the desired classification instance has been selected, the user can activate the Submit button to cause the document to be submitted to the enterprise database 28 which is the Submit disposition of the decision box 46 of FIG. 6. Alternately, the user may select the Delete control button 60 to delete the candidate document or the Cancel button to abort further processing of the document.

Retraining

As will be understood, entries in the enterprise records database 28 can be used as a document collection that can be used to effect the training mode operation of the classification agent 32. To begin using the system, a sample records database can be used as was described previously with reference to the description of the training mode operation of the classification agent 32. However, as the system operates and the enterprise records database 28 becomes populated with more and more records, the enterprise records database 28 itself can be provided to the classification agent operating in training mode to "retrain" the classification agent based on a larger and larger database to refine the ability of the classification agent to classify candidate documents in the evaluation mode. The benefit of retraining the classification agent will be improved automated classification of candidate documents as well as to enable the classification agent to accommodate new classifications or reclassifications of records.

For example, the classification agent may produce significant numbers of case 3 file to Classification Review folder results that will cause such documents to be placed into the Classification Review folder 21 and require review by assigned users. Once the documents placed into the Classification Review folder have been reviewed and filed to existing or to newly established classifications, the classification agent can then be activated in training mode to enable the classification agent to incorporate the filing classification that was made to the documents it had previously filed to the Classification Review folder. As a result of this retraining, classification agent 32 can develop a probabilistic association to form the basis for assigning a classification instance and a confidence factor based on the document classifications that were effected by user review of the records in the Classification Review folder. After retraining, operation of the classification agent in evaluation mode will tend to decrease the number of documents that are placed into the Classification Review folder.

As will be understood from the above, the particular language of the documents presented to the system for training and classification is not a limitation of the system, which relies on the text contents of the documents. Thus the text of the documents may be in any language and, consequently, the operation of the invention is language independent and not restricted or limited to any particular language such as English, French, or German.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for classifying an electronic document in a computer-based system, comprising:

generating, by one or more processors, a set of confidence data comprising for each of one or more classification instances a corresponding determined confidence data, wherein a confidence data indicates a degree of confidence that the electronic document is associated with a corresponding classification instance;

in the event at least one of the confidence data in the set exceeds a first predetermined threshold, assigning, by one or more processors, a classification to the electronic document without user input;

in the event none of the confidence data in the set exceeds the first predetermined threshold and that at least one of the confidence data in the set exceeds a second predetermined threshold that is lower than the first predetermined threshold, receiving via a user interface a user input indicating a selection of a classification comprising the set and determining, by one or more processors, based at least in part on the user input, that a user-selected classification should be assigned to the electronic document; and assigning a review classification to the electronic document to indicate that the electronic document is required to be reviewed by a user if no classification instance a plurality of classification instances is associated with the confidence data that exceeds the first predetermined threshold and fewer than a prescribed number of classification instance(s) in the plurality of classification instances has the confidence data that exceeds the second predetermined threshold.

2. The method recited in claim 1, wherein determining the confidence data includes using information obtained by analyzing at least one training document associated with a pre-assigned classification.

3. The method of claim 1, further comprising in response to receiving the user input indicating the selection of the classification, assigning the classification to the electronic document based at least in part on the user input.

4. A system for classifying an electronic document, comprising:
   a processor; and
   a memory coupled with the processor, wherein the memory is configured to provide the processor with instructions which when executed cause the processor to:
      generate a set of confidence data comprising for each of one or more classification instances a corresponding determined confidence data, wherein a confidence data indicates a degree of confidence that the electronic document is associated with a corresponding classification instance;
      in the event at least one of the confidence data in the set exceeds a first predetermined threshold, assign a classification to the electronic document without user input;
      in the event none of the confidence data in the set exceeds the first predetermined threshold and that at least one of the confidence data in the set exceeds a second predetermined threshold that is lower than the first predetermined threshold, receive via a user interface a user input indicating a selection of a classification comprising the set and determining, based at least in part on the user input, that a user-selected classification should be assigned to the electronic document; and
      assigning a review classification to the electronic document to indicate that the electronic document is required to be reviewed by a user if no classification instance a plurality of classification instances is associated with the confidence data that exceeds the first predetermined threshold and fewer than a prescribed number of classification instance(s) in the plurality of classification instances has the confidence data that exceeds the second predetermined threshold.

5. The system recited in claim 4, wherein determining the confidence data includes using information obtained by analyzing at least one training document associated with a pre-assigned classification.

6. A computer program product for classifying an electronic document, the computer program product being embodied in a non-transitory computer readable storage medium and comprising computer instructions for:
   generating a set of confidence data comprising for each of one or more classification instances a corresponding determined confidence data, wherein a confidence data indicates a degree of confidence that the electronic document is associated with a corresponding classification instance;
   in the event at least one of the confidence data in the set exceeds a first predetermined threshold, assigning a classification to the electronic document without user input; and
   in the event none of the confidence data in the set exceeds the first predetermined threshold and that at least one of the confidence data in the set exceeds a second predetermined threshold that is lower than the first predetermined threshold, receiving via a user interface a user input indicating a selection of a classification comprising the set and determining, based at least in part on the user input, that a user-selected classification should be assigned to the electronic document; and
   assigning a review classification to the electronic document to indicate that the electronic document is required to be reviewed by a user if no classification instance a plurality of classification instances is associated with the confidence data that exceeds the first predetermined threshold and fewer than a prescribed number of classification instance(s) in the plurality of classification instances has the confidence data that exceeds the second predetermined threshold.

7. The computer program product recited in claim 6, wherein determining the confidence data includes using information obtained by analyzing at least one training document associated with a pre-assigned classification.

\* \* \* \* \*